(12) United States Patent
Mabuchi

(10) Patent No.: US 8,512,573 B2
(45) Date of Patent: Aug. 20, 2013

(54) APPARATUS FOR TREATMENT OF ORGANIC WASTE MATERIAL AND METHOD FOR SEPARATING AND RECOVERING LIQUID MATERIAL

(75) Inventor: Kousaku Mabuchi, Tamana-gun (JP)

(73) Assignee: G-8 International Trading Co., Ltd., Kanagawa (JP)

(*) Notice: Subject to any disclaimer, the term of this patent is extended or adjusted under 35 U.S.C. 154(b) by 831 days.

(21) Appl. No.: 11/921,147

(22) PCT Filed: May 27, 2005

(86) PCT No.: PCT/JP2005/009728
§ 371 (c)(1),
(2), (4) Date: Jun. 16, 2009

(87) PCT Pub. No.: WO2006/126273
PCT Pub. Date: Nov. 30, 2006

(65) Prior Publication Data
US 2009/0314700 A1   Dec. 24, 2009

(51) Int. Cl.
*C02F 1/02* (2006.01)
(52) U.S. Cl.
USPC ........... 210/761; 210/205; 210/219; 210/220; 422/226; 422/229
(58) Field of Classification Search
USPC ................. 210/761, 766, 177, 178, 179, 180, 210/181, 205, 208, 218, 219, 220, 257.1, 210/258, 259, 262, 908, 909, 910; 422/26, 422/184.1, 224, 225, 226, 229, 232, 242, 422/295, 298, 300, 305, 307, 309; 366/318, 366/321, 322, 323; 588/312; 201/25, 35
See application file for complete search history.

(56) References Cited

U.S. PATENT DOCUMENTS

| 3,669,406 | A | * | 6/1972 | Moore .................... 251/315.13 |
| 4,983,296 | A | * | 1/1991 | McMahon et al. ............ 210/774 |
| 5,089,228 | A | * | 2/1992 | Meijer ............................ 422/37 |
| 2003/0147771 | A1 | * | 8/2003 | Hodgins ......................... 422/26 |
| 2004/0191139 | A1 | * | 9/2004 | Numata et al. ............. 422/245.1 |

FOREIGN PATENT DOCUMENTS

| JP | 2000-033355 A | 2/2000 |
| JP | 2001-192670 A | 7/2001 |

(Continued)

OTHER PUBLICATIONS

Machine translation of JP 2003-074985 (2003) (obtained from JPO 9-2011).*

*Primary Examiner* — Lucas Stelling
(74) *Attorney, Agent, or Firm* — Preti Flaherty Beliveau & Pachios LLP

(57) ABSTRACT

Provided is an apparatus for treating by itself an organic waste material which can treat the waste material with steam having a high temperature and a high pressure and which can separate and recover the waste material and a liquid material given by performing the treatment continuously by a simple operation. An apparatus (10) for treating an organic waste material characterized in that it comprises a sealed vessel (12) having a closed space (S1) for holding an organic waste material therein, a steam jet means (14) provided in the sealed vessel (12) for providing a steam jet having such temperature and pressure that the waste material can be carbonized, a discharge port (16) arranged at the bottom of the sealed vessel (12) and having an opening/closing mechanism, and a separating and recovering means (18) for separating the waste material and a liquid material given after the treatment only by direct discharge operation from the discharge port (16) and recovering the waste material and the liquid material.

21 Claims, 2 Drawing Sheets

(56) References Cited

FOREIGN PATENT DOCUMENTS

| | | |
|---|---|---|
| JP | 2003-047409 A | 2/2003 |
| JP | 2003-074985 A | 3/2003 |
| JP | 2004-195449 A | 7/2004 |
| JP | 2004-261682 A | 9/2004 |
| JP | 2004-321855 A | 11/2004 |
| WO | WO 02092214 A1 * | 11/2002 |

* cited by examiner

APPARATUS FOR TREATMENT OF ORGANIC WASTE MATERIAL AND METHOD FOR SEPARATING AND RECOVERING LIQUID MATERIAL

This application is a §371 national phase filing of PCT/JP2005/009728 filed May 27, 2005.

TECHNICAL FIELD

The present invention relates to an apparatus for treatment of an organic waste and a method for separating and recovering a liquid for treating an organic material contained in a medical waste, a household waste, an industrial waste, and the like using a steam at a high temperature and a high pressure and, obtaining the treated waste and a liquid which are separated from each other after the treatment.

BACKGROUND ART

As a method for treating an organic waste, there is known a method for treating a waste using a steam at a high temperature and a high pressure in a sealed vessel, for example (refer to Patent Document 1, for example). It is considered that the conventional method for treating a waste using the steam hardly generates toxic nitrogen oxides, sulfur oxides, and the like, which are generated in a treatment by incineration, thus there pose no problems of environmental pollution, and a safe waste treatment can thus be expected.
[Patent Document 1]
Japanese Patent Publication No. 2000-33355

DISCLOSURE OF THE INVENTION

Problems to be Solved by the Invention

However, when wastes are treated by a steam as described in Patent Document 1, since a part of a large amount of the vapor present in the vessel is liquefied, or water originally contained in the wastes and the like is present, the treated solid and the liquid are thus present in a mixed state in the vessel. In this state with the coexisting liquid, the treated waste after removal is inconvenient for transportation, storage, and the like, and difficult in handling. The treatment method according to Patent Document 1 includes a gas/liquid/solid separator 90 independently of a reactor 140, which provides the treatment using the steam at the high temperature and the high pressure, and it is thus necessary to separate ash 120, treatment water 110, and the like after the treatment. In other words, the treatment method according to Patent Document 1 poses such problems as (1) a high treatment cost due to independently necessary apparatuses such as a separator, (2) a large amount of labor due to the complex treatment process, (3) a long period required for the treatment, and (4) necessity for securing a broad site for independently installing a reactor and the separator.

The present invention is devised in view of the foregoing problems and one of objects thereof is to provide an apparatus for treatment of an organic waste which can safely treat a waste in only one apparatus by means of a steam at a high temperature and a high pressure, and can separate and recover continuously the treated waste and a liquid by means of a simple operation. Moreover, another object thereof is to provide an apparatus for treatment of an organic waste which has a simple structure, and can be manufactured at a low cost. Further, another object thereof is to provide a method for simply separating and recovering a treated waste and a liquid.

Means to Solve the Problems

In order to achieve the above objects, the present invention provides an apparatus 10 for treating an organic waste including a sealed vessel 12 that provides a closed space S1 for storing an organic waste therein, steam jet means 14 that blows off a steam into the sealed vessel 12 at a temperature and a pressure as high as the waste can be carbonized, a discharge port 16 that is provided on a bottom side of the sealed vessel 12, and includes an opening/closing mechanism 26, and separating and recovering means 18 that separates and recovers the treated waste and a liquid only by a direct discharge operation from the discharge port 16. Though the sealed vessel 12 may be in a rectangular box shape, a cubic polygonal prismatic shape, a cylindrical shape, a barrel shape, a drum shape, or other arbitrary shapes, the discharge is preferably carried out by gravity from the discharge port 16 provided on the bottom surface side. The bottom surface of the sealed vessel is preferably provided as a slope inclining downward to the discharge port.

Moreover, the separating and recovering means 18 may include a recovery unit 50 for the liquid that includes a closed space S2 different from the closed space S1 of the sealed vessel 12, and communicates with the inside of the sealed vessel 12 via the discharge port 16, and a gravity flow recovery mechanism 52 that recovers only the liquid by causing the liquid in the sealed vessel 12 to flow by gravity via the discharge port 16 down to the recovery unit 50. The treated waste treated near the discharge port 16 remains in the sealed vessel 12, and only the liquid flows down to the recovery unit 50 due to the gravity, resulting in the separation and recovery of the waste and the liquid. The configuration of the recovery unit 50 may be arbitrary as long as it includes the closed space S2 for recovering the liquid such as a metal tank, a box in a cubic polygonal prismatic shape, and a pipe. A plurality of the storage units may be formed.

Moreover, the gravity flow recovery mechanism 52 may include equal pressure forming means 62 that causes the closed space S1 of the sealed vessel 12 and the closed space S2 of the recovery unit 50 to have an equal pressure before the recovery operation of the liquid. The configuration, which always maintains the sealed vessel 12 and the recovery unit 50 to the equal pressure, enables the recovery operation of the liquid immediately after the treatment, resulting in a reduction in the operation period.

Moreover, the equal pressure forming means 62 may include an equal pressure communication pipe 64 that causes the closed space S1 of the sealed vessel 12 and the closed space S2 of the recovering unit 50 to communicate with each other via a path different from the recovery path of the liquid via the discharge port 16. The equal pressure communication pipe may be always in a communication state, thereby causing the sealed vessel 12 and the recovering unit 50 to have the equal pressure. It is only necessary for the equal pressure communication pipe 64 to cause the sealed vessel 12 and the recovery unit 50 to communicate with each other thereby having an equal pressure at least before the recovery operation of the liquid, and there may be provided an opening/closing mechanism for switching the equal pressure communication pipe 64 between the communication state and the closed state.

Moreover, the communication between the equal pressure communication pipe 64 forming the different path and the sealed vessel 50 may be carried out via a communication/connection portion 68 set on a top end side of the sealed vessel 12.

Moreover, the gravity flow recovery mechanism 52 may include a liquid recovery flow passage 54 that causes the discharge port 16 of the sealed vessel 12 and the recovery unit 50 to communicate and connect with each other, and the liquid recovery flow passage 54 may be arranged so as to be horizontal or inclined downward from the side communicating with the discharge port 16 to the side of the recovery unit 50.

Moreover, an opening/closing mechanism 26 may be provided in a proper position of a discharge path R1 from the discharge port 16 for discharging the treated waste, and a liquid inlet port 58 of the liquid recovery flow passage 54 may communicate with and may be connected to the upstream side of the discharge path R1 with respect to the opening/closing mechanism 26.

Moreover, the liquid recovery flow passage 54 may be provided with an opening/closing mechanism 60 that selectively switches the communication state so as to close the flow passage during the treatment of the waste in the sealed vessel 12, and so as to open the flow passage for recovering only the liquid after the treatment.

Moreover, a bottom surface of the closed space S2 of the recovery unit 50 may be provided so as to be lower than the position of the discharge port 16 of the sealed vessel 12.

Moreover, the recovery unit 50 may be provided such that the liquid surface of the liquid recovered in the closed space S2 thereof is always lower than the discharge port 16.

The apparatus may include agitating means 30 that agitates the waste in the sealed vessel 12.

Moreover, the sealed vessel 12 may be formed into a horizontal barrel shape provided with the discharge port 16 on the bottom side at a center portion in the left/right direction, and the diameter gradually decreases from the center portion in the left/right direction toward both left and right ends, the agitating means 30 includes a rotation shaft 49 that is provided so as to extend in the widthwise direction in the sealed vessel 12, and is supported axially and rotatably, and an agitating blade 48 that is attached to the rotation shaft 49, and includes a portion widening in the circumferential direction of the rotation shaft 49, and the length of the agitating blade 48 from the rotation shaft 49 to a blade tip is configured so as to be long at a center position in the lengthwise direction of the rotation shaft 49, and gradually decreases toward the both ends corresponding to the horizontal barrel shape of the sealed vessel 12.

Moreover, the steam jet means 14 may include a steam jet pipe 28 used also as the rotation shaft 49 that is a rotation shaft formed as a hollow pipe, and is configured by forming a plurality of steam jet holes 44 on a circumferential surface of the hollow pipe.

Further, the present invention provides a method for separating and recovering a liquid in a treatment of an organic waste, where, after an organic material is treated while a steam at a high temperature and a high pressure is blown off in a first sealed vessel (12) including a discharge port 16 for opening and closing, in order to separate the treated material and a liquid from each other and recover, a second sealed vessel (50) that communicates with and is connected to the discharge port 16 of the first sealed vessel (12), and is caused to have a pressure equal to that of the first sealed vessel (12) via a communication unit (64) different from the discharge port 16 is provided, and, after the sealed vessels (12, 50) have the equal pressure, only a liquid is separated and recovered into the second sealed vessel (50) by a gravity flow of the liquid via the discharge port 16.

EFFECTS OF THE INVENTION

With the apparatus for treating an organic waste according to the present invention, by means of the configuration including the sealed vessel that provides the closed space for storing an organic waste therein, the steam jet means that blows off the steam at the temperature and the pressure as high as the waste can be carbonized into the sealed vessel, the discharge port that is provided on the bottom side of the sealed vessel, and includes the opening/closing mechanism, and the separating and recovering means that separates and recovers the treated waste and the liquid only by the direct discharge operation from the discharge port, the waste can be safely treated in only one apparatus, and the treated waste and the liquid can be separated and recovered by means of the simple operation following the treatment. Especially, it is not necessary to bring the waste mixed with the liquid, which is difficult in handling, to the outside, so the waste can thus be separated and recovered directly from the sealed vessel used for the treatment, resulting in a simple and smooth operation. Moreover, the size of the overall apparatus does not increase, thus the apparatus can be manufactured at a low cost. Moreover, the recovered waste separated from the liquid contains a small amount of water, is thus convenient for handling, transportation, management, and the like, and the carbonized waste can be processed into a fuel, a soil conditioner, and the like in a short period, for example.

Moreover, by means of the configuration where the separating and recovering means includes the recovery unit for the liquid that includes the closed space different from the closed space of the sealed vessel and communicates with the sealed vessel via the discharge port, and the gravity flow recovery mechanism that recovers only the liquid by causing the liquid in the sealed vessel to flow by gravity via the discharge port down to the recovery unit, there is provided a simple configuration which does not employ a power source, and the like, and can separate and recover the treated waste and the liquid using the simple and low-cost structure.

Moreover, by means of the configuration where the gravity flow recovery mechanism includes the equal pressure forming means that causes the closed space of the sealed vessel and the closed space of the recovery unit to have an equal pressure before the recovery operation of the liquid, it is possible to prevent the liquid and the waste together from being fed together by a pressure to the side of the recovery unit when the liquid is recovered to the recovery unit, thereby properly separating only the liquid from the treated waste, and recovering the liquid by means of the gravity flow. Moreover, the liquid can be separated and recovered while the inside of the sealed vessel where the waste has been treated is kept to the high pressure, resulting in a reduction of the operation.

Moreover, by means of the configuration where the equal pressure forming means includes the equal pressure communication pipe that causes the closed space of the sealed vessel and the closed space of the recovering unit to communicate with each other via the path different from the recovery path of the liquid via the discharge port, the efficient equal pressure forming means can be realized by a simple and low-cost structure.

Moreover, by means of the configuration where the communication between the equal pressure communication pipe forming the different path and the sealed vessel is carried out via the communication/connection portion set on the top end side of the sealed vessel, a configuration which hardly allows the entrance of the waste to the equal pressure communication pipe is realized by the simple structure, thereby preventing the communication pipe from being blocked by the waste, resulting in properly maintaining the communication state via the equal pressure communication pipe, and securing the equal pressure in the sealed vessel and the recovery unit.

Moreover, by means of the configuration where the gravity flow recovery mechanism includes the liquid recovery flow passage that causes the discharge port of the sealed vessel and the recovery unit to communicate and connect with each other, and the liquid recovery flow passage is arranged so as to be horizontal or inclined downward from the side communicating with the discharge port to the side of the recovery unit, it is possible to prevent a counter flow of the liquid and the stagnation of the gravity flow upon the recovery of the liquid, thereby smoothly recover the liquid.

Moreover, by means of the configuration where the opening/closing mechanism is provided in a proper position of the discharge path from the discharge port for discharging the treated waste, and the liquid inlet port of the liquid recovery flow passage communicates with and is connected to the upstream side of the discharge path with respect to the opening/closing mechanism, it is possible to realize a structure which hardly allows the entrance of the waste to the liquid inlet port, thereby flowing down only the liquid by gravity in the liquid recovery flow passage, and thus properly carrying out the separation and recovery of the liquid in a simple structure.

Moreover, by means of the configuration where the liquid recovery flow passage is provided with the opening/closing mechanism that selectively switches the communication state so as to close the flow passage during the treatment of the waste in the sealed vessel, and so as to open the flow passage for recovering only the liquid after the treatment, it is possible to treat the liquid, which contains bad smell and harmful components resulting from the liquefaction of the vapor and a liquid contained in the waste as well as the waste, using the steam at the high temperature and the high pressure, and to recover the liquid in a state where the liquid is sterilized and the bad smell and harmful components are decomposed, resulting in eliminating necessity of a secondary treatment of the recovered liquid, and saving labor and time.

Moreover, by means of the configuration where the bottom surface of the closed space of the recovery unit is provided so as to be lower than the position of the discharge port of the sealed vessel, the gravity flow does not stagnate upon the recovery of the liquid, resulting in a smooth recovery of the liquid in the recovery unit.

Moreover, by means of the configuration where the recovery unit is provided such that the liquid surface of the liquid recovered in the closed space thereof is always lower than the discharge port, it is especially possible to realize a smooth gravity flow of the liquid, thereby securing the recovery in the recovery unit even after a certain amount of the liquid has been recovered in the recovery unit.

Moreover, by means of the configuration where the apparatus includes the agitating means that agitates the waste in the sealed vessel, the waste can be treated evenly and quickly.

Moreover, by means of the configuration that the sealed vessel is formed into the horizontal barrel shape provided with the discharge port on the bottom side at the center portion in the left/right direction, and the diameter gradually decreases from the center portion in the left/right direction toward both the left and right ends, the agitating means includes the rotation shaft that is provided so as to extend in the widthwise direction in the sealed vessel, and is supported axially and rotatably, and the agitating blade that is attached to the rotation shaft, and includes the portion widening in the circumferential direction of the rotation shaft, and the length of the agitating blade from the rotation shaft to the blade tip is configured so as to be long at the center position in the lengthwise direction of the rotation shaft, and gradually decreases toward the both ends corresponding to the horizontal barrel shape of the sealed vessel, it is possible to easily take out the waste in the sealed vessel with the aid of the gravity. Simultaneously, it is possible to surely agitate the waste evenly according to the shape of the sealed vessel.

Moreover, by means of the configuration that the steam jet means includes the steam jet pipe used also as the rotation shaft that is a rotation shaft formed as a hollow pipe, and is configured by forming a plurality of the steam jet holes on the circumferential surface of the hollow pipe, it is possible to directly blow off the steam at the high temperature and the high pressure on the waste for an efficient treatment of the waste. Moreover, it is possible to efficiently arrange the steam jet means and the agitating means in the sealed vessel.

Further, with the method for separating and recovering a liquid in a treatment of an organic waste according to the present invention, by means of the configuration that, after the organic material is treated while the steam at the high temperature and the high pressure is blown off in the first sealed vessel including the discharge port for opening and closing, in order to separate the treated material and the liquid from each other and recover, the second sealed vessel that communicates with and is connected to the discharge port of the first sealed vessel, and is caused to have a pressure equal to that the first sealed vessel via the communication unit different from the discharge port is provided, and, after the sealed vessels have the equal pressure, only the liquid is separated and recovered into the second sealed vessel by the gravity flow of the liquid from the discharge port, it is possible to separate and recover only the liquid from the treated waste with the simple configuration which does not employ a power source, and with the simple operation.

Figure 1:
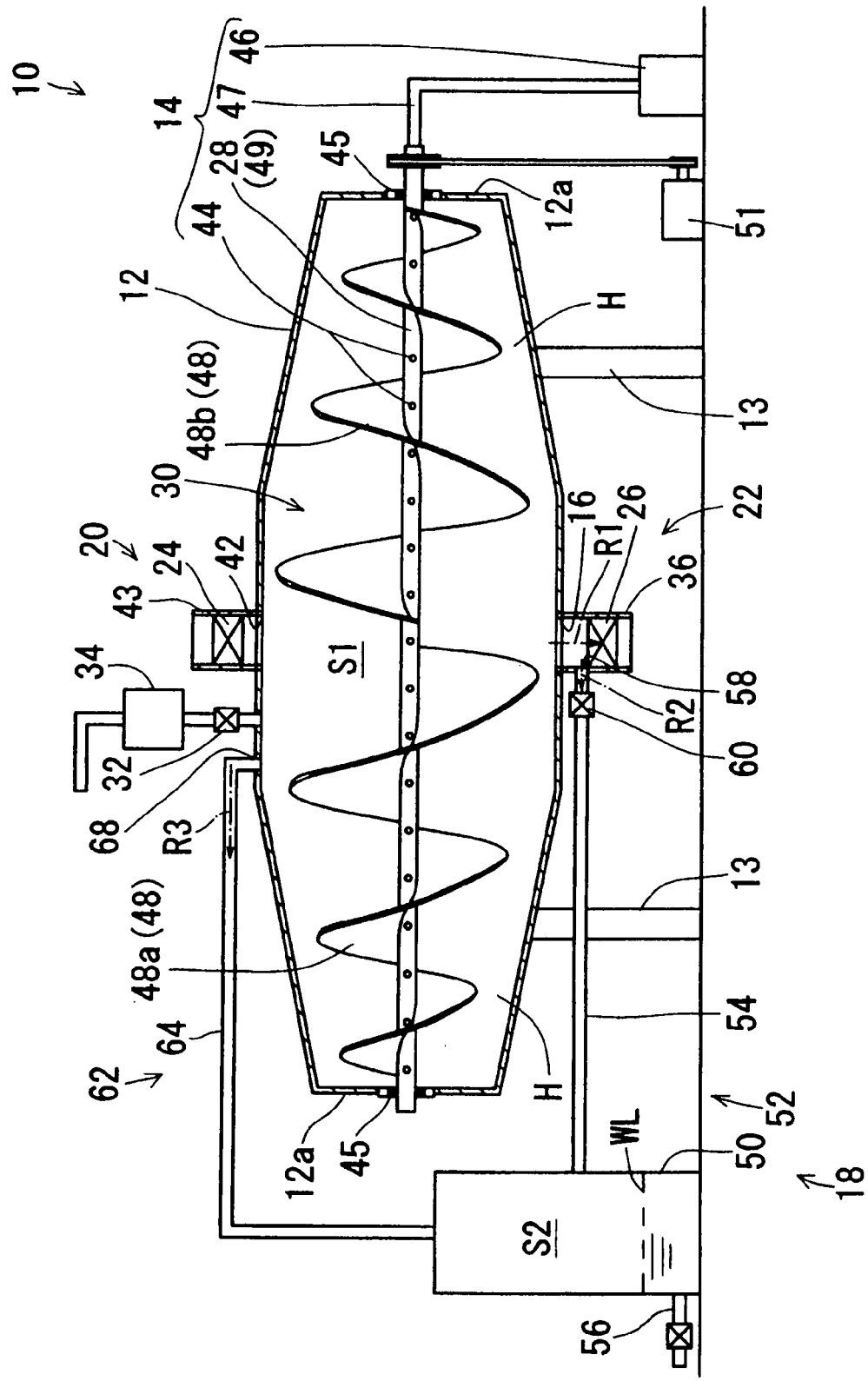
FIG. 1 is an explanatory diagram of an apparatus for treatment of an organic waste according to an embodiment of the present invention partially cut.

EXPLANATION OF REFERENCE NUMERALS 10 apparatus for treatment of an organic waste
12 sealed vessel
14 steam jet means
16 discharge port
18 separating and recovering means
26 opening/closing mechanism
30 agitating means
50 recovery unit
52 gravity flow recovery mechanism
54 liquid recovery flow passage
58 liquid inlet port
60 opening/closing mechanism
62 equal pressure forming means
64 equal pressure communication pipe

BEST MODES FOR CARRYING OUT THE INVENTION

A description will now be given of embodiments of the present invention with reference to accompanying drawings. An apparatus for treatment of an organic waste according to the present invention is an apparatus which uses a steam at a high temperature and a high pressure to treat an organic waste contained in medical wastes disposed from medical institutions such as injection syringes made of a synthetic resin, gauzes with blood, disposable diapers, operated internal organs, as well as household wastes disposed from general households such as raw garbage, and containers made of synthetic resin such as plastic, and industrial wastes such as wastes from food processing, agricultural and fishery wastes, wastes of various industrial products, sewage sludge, and the like. Moreover, the apparatus effectively separates the treated waste and a liquid with simple operation, and recovers the wastes and the liquid separately.

Figure 2:
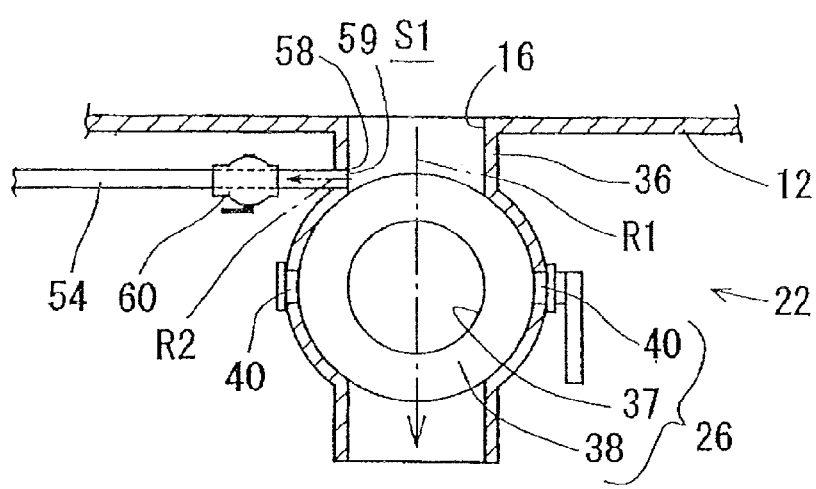
FIG. 2 is an enlarged partial cross section view of a neighborhood of a discharge port of the treatment apparatus in FIG. 1.

FIGS. 1 and 2 show an embodiment of the apparatus for treatment of an organic waste (also simply referred to as "treatment apparatus" hereinafter) according to the present invention. As shown in FIG. 1, the treatment apparatus 10 according to the present embodiment includes a sealed vessel 12 which stores an organic waste therein, steam jet means 14 which blows off a steam at a high temperature and a high pressure in the sealed vessel, a discharge port 16 which is provided on a bottom side of the sealed vessel 12, and separating and recovering means 18 which separates and recovers the treated waste and a liquid.

As shown in FIG. 1, the sealed vessel 12 is a first closed vessel which includes a closed space S1 which stores the waste to be treated therein, and treats the waste at the high temperature and under the high pressure in the closed space S1. According to the present embodiment, the sealed vessel 12 is supported by support legs 13 so as to be placed at a certain height with respect to the ground. The sealed vessel 12 is formed into a horizontal barrel shape wherein the diameter of which gradually decreases from a center portion in the left/right direction toward end walls 12a at both left and right ends. The sealed vessel 12 is formed by machining a sheet metal for providing heat resistance and pressure resistance capabilities, for example, and has a size to store a waste in approximately 2 m$^3$. The sealed vessel 12 is provided with a charge portion 20 on a top side of the center portion, and a discharge portion 22 on a bottom side of the center portion, which are respectively opened and closed by opening/closing mechanisms 24 and 26. According to the present embodiment, a steam jet pipe 28 which constitutes steam jet means 14, and agitating means 30 which agitates the waste are provided in the closed space S1 of the sealed vessel 12. It should be noted that the sealed vessel 12 is provided with a safety valve 32 which can adjust a set pressure, for example, and releases the internal vapor if the internal pressure exceeds a set value. Moreover, a silencing/deodorizing apparatus 34 is provided in a proper position of an exhaust pipe connected to the safety valve 32, and the vapor exhausted via the safety valve 32 is silenced and deodorized, and then is exhausted to the outside air.

According to the present embodiment, the discharge port 16 opens on the bottom side in the center portion in the left/right direction of the sealed vessel 12 as shown in FIGS. 1 and 2 thereby setting the discharge direction of the waste downward. According to the present embodiment, the diameter of the discharge port 16 is set approximately to 300 mm, for example. According to the present embodiment, a discharge cylinder 36 which protrudes downward is connected to the discharge port 16, and forms a discharge path R1 for the treated waste, and an opening/closing mechanism 26 which opens and closes the discharge port 16 is provided in a proper position of the discharge path R1. In other words, according to the present embodiment, the discharge portion 22 is constituted by the discharge port 16, the discharge cylinder 36, and the opening/closing mechanism 26. According to the present embodiment, the opening/closing mechanism 26 includes an open-close valve such as a ball valve which opens and closes the discharge path R1 by rotating a valve body 38 in a ball shape which has at the center a through hole 37 communicating with the discharge path R1 about a rotation shaft 40 orthogonal to the discharge path, for example. Since the sealed vessel 12 is formed into a horizontal barrel shape, the waste inside tends to gather at the center portion provided with the discharge port 16 due to the gravity, and it is possible to easily discharge the waste from the discharge port 16 by simply opening the opening/closing mechanism 26.

As the charge portion 20 according to the present embodiment, a charge port 42 is opened on the top side of the sealed vessel 12, and the charge port 42 is provided with a charge tube 43 protruding upward, and an opening/closing mechanism 24 such as a ball valve which opens and closes the charge tube 43 is provided. The charge port is opened for charging the waste in the sealed vessel through the opening/closing mechanism 24, and is closed during the treatment in order to keep the closed state of the closed space S1 inside the sealed vessel 12.

According to the present embodiment, the steam jet means 14 blows off the steam having the high temperature and the high pressure in the sealed vessel 12, and brings the inside of the sealed vessel 12 into a state having the high temperature and high pressure, thereby treating the waste using the steam. According to the present embodiment, as shown in FIG. 1, the steam jet means 14 includes a steam jet pipe 28 formed as a hollow pipe which is disposed inside the sealed vessel 12, and is provided with a large number of steam jet holes 44 on a circumferential surface, a steam generating apparatus 46 such as a boiler, and a steam feed pipe 47 which feeds the steam from the steam generating apparatus 46 to the inside of the steam jet pipe 28. The temperature and the pressure of the steam blown off from the steam jet means 14 into the sealed vessel 12 are set as high as the waste (mainly solid components) is carbonized. According to the present embodiment, the temperature and the pressure of the steam blown off from the steam jet pipe 28 are respectively set to approximately 180 to 250° C., and 15 to 35 atm, for example. The steam then brings the temperature and the pressure inside the sealed vessel 12 respectively to approximately 180 to 250° C., and 15 to 35 atm. According to the present embodiment, the steam jet pipe 28 is disposed approximately at the center position in the vertical direction of the sealed vessel 12, extends in the widthwise direction, and is axially and rotatably supported by bearings 45 provided on both the end walls 12a of the sealed vessel. In other words, the steam jet pipe 28 is configured to radially blow off the steam while rotating about the horizontal axis, thereby directly applying the steam on the waste. It should be noted that the steam jet pipe 28 is rotated by a rotational driving force provided via a chain or the like by a rotational driving apparatus 51 such as a motor. Further, according to the present embodiment, an agitating blade 48 is attached to the steam jet pipe 28, and the steam jet pipe 28 serves also as a rotation shaft 49 of the agitating means. In other words, according to the present embodiment, the steam jet means 14 includes the steam jet pipe 28 used also as the rotation shaft 49 that is a rotation shaft of the agitating means formed as the hollow pipe, and is configured by forming the multiple steam jet holes on a circumferential surface of the hollow pipe. It should be noted that the steam jet means is not limited to the configuration according to the present embodiment, and may have a configuration which blows off the steam at a tip of a pipe inserted into the sealed vessel, a configuration which provides multiple steam jet pipes, or any other configurations.

The agitating means 30 is means which agitates the waste to be treated in the sealed vessel, and can evenly and quickly treat the waste. According to the present embodiment, the agitating means 30 includes the rotation shaft 49 formed by the steam jet pipe 28, and the agitating blade 48 attached to the rotation shaft 49, and includes a portion which extends in the circumferential direction of the rotation shaft. According to the present embodiment, the agitating blade 48 includes a right-handed spiral blade 48*a* and a left-handed spiral blade 48*b* which are provided so as to be wound in the mutually opposing directions on the both sides of approximately the center of the axial direction of the rotation shaft 49. The agitating blade 48 is provided such that the length from the rotation shaft to a blade tip gradually decreases in diameter from the center portion in the left/right direction toward the both ends. As a result, the waste can be surely agitated according to the horizontal barrel shape of the sealed vessel 12. Moreover, the agitating blade 48 is provided such that a certain gap H is formed between the blade tip and an inner wall of the sealed vessel 12. According to the present embodiment, the spiral blades 48*a* and 48*b* agitate the waste while transporting the waste from the center portion toward both the end walls, and crushing the solid waste. It should be noted that the agitating means is provided so as to crush the waste into a final size of approximately 0.3 to 0.8 mm, for example, according to the present embodiment. The waste which has been transported toward both the end walls 12*a* by the agitating blade 48 is pressed and fed on the sides of the end walls 12*a* by the waste which has been transported subsequently, and is transported to return to the center via the gap H along the inner wall of the sealed vessel 12. The agitating means 30 is not limited to the configuration according to the present embodiment, and may have a configuration which agitates using multiple agitating blades in a plate shape or a fin shape or rod bodies attached to the rotation shaft, a configuration which agitates using a pressurized fluid such as a steam, or any other configurations. Moreover, the size of the crushed waste may be arbitrarily set.

According to the present embodiment, the waste is carbonized by the treatment for a required period such as approximately 30 to 60 minutes, while the waste is being agitated at the high temperature and under the high pressure in the sealed vessel as described above. It should be noted that it is expected that the above treatment can decompose PCB contained in the waste, for example. For example, when a waste or the like containing transformer oil was treated, it was confirmed that the PCB density of 80 ppm before the treatment decreased to approximately 0.005 ppm after the treatment. A liquid accumulates in the sealed vessel 12 as a result of a part of the steam which is liquefied and water contained in the waste, and is mixed with the treated and carbonized waste.

The separating and recovering means 18 is the separating and recovering means which separates and recovers the treated waste and the liquid in the sealed vessel 12 only by the direct operation from the discharge port after the steam treatment. According to the present embodiment, the separating and recovering means 18 includes a recovery unit 50 for the liquid which communicates with the inside of the sealed vessel 12 via the discharge port 16, and a gravity flow recovery mechanism 52 which recovers the liquid into the recovery unit 50 by means of a gravity flow via the discharge port 16 as shown in FIG. 1.

The recovery unit 50 is a second sealed vessel which internally includes another closed space S2 different from the closed space S1 of the sealed vessel 12. According to the present embodiment, the recovery unit 50 is constituted by a metal sealed tank in a cylindrical shape with heat resistance and pressure resistance capabilities, for example. According to the present embodiment, the recovery unit 50 is connected to the discharge port 16 of the sealed vessel 12 via the liquid recovery flow passage 54 formed by a metal pipe member, for example. The recovery unit 50 is provided such that a bottom surface of the closed space S2 is lower than the position of the discharge port 16 of the sealed vessel 12, and the liquid level WL of the liquid recovered in the closed space S2 is always lower than the discharge port 16, thereby promoting a smooth gravity flow of the liquid from the side of the discharge port to the side of the recovery unit. It should be noted that the recovery unit 50 is provided with an outlet drain 56 for the recovered liquid to be opened/closed by an open/close valve.

The gravity flow recovery mechanism 52 is a gravity flow recovery mechanism which causes the liquid collected in the sealed vessel 12 to flow by gravity from the discharge port to the recovery unit 50. As shown in FIG. 2, according to the present embodiment, the gravity flow recovery mechanism 52 has a configuration including a liquid recovery flow passage 54, and the liquid recovery flow passage 54 causes its liquid inlet opening 58 to communicate with and to connect to the discharge port 16, resulting in forming a recovery path R2 for the liquid flowing therein branching from the discharge path R1 in which the treated waste flows through. According to the present embodiment, the liquid recovery flow passage 54 is formed by a metal pipe with the inner diameter of approximately 6 mm, for example. The liquid recovery flow passage 54 is provided with an opening/closing mechanism 60 which selectively switches the communication state of the flow passage. The opening/closing mechanism 60 is switched so as to close the flow passage during the treatment of the waste in the sealed vessel, and so as to open the flow passage for separating and recovering only the liquid after the treatment. As a result, the liquid which is the water contained in the waste and the liquefied vapor, and contains bacteria and bad smell in the waste as well as the waste can be treated by the steam at the high temperature and the high pressure. Then, after the treatment, the separated and recovered liquid is sterilized, and is in a state where the bad smell and harmful components are decomposed, resulting in eliminating necessity of a secondary treatment of the separated and recovered liquid, and saving labor and time.

Figure 3:
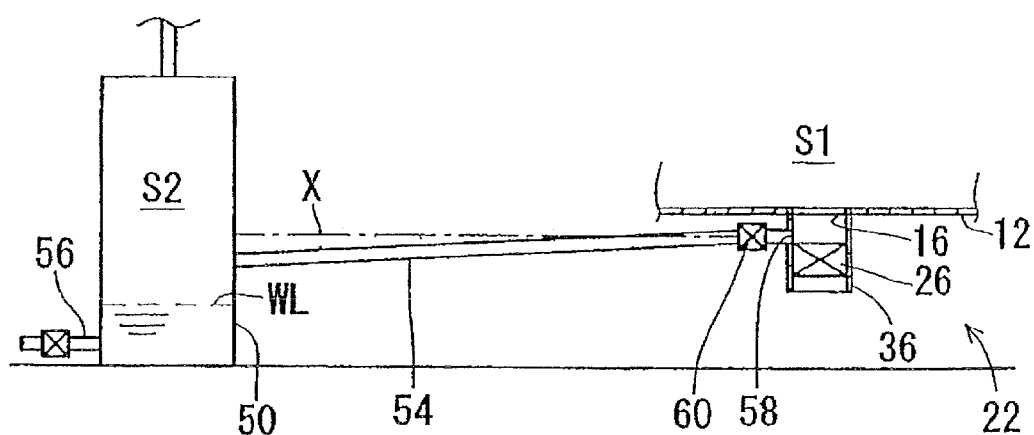
FIG. 3 is an explanatory diagram of a principal portion showing another embodiment of a liquid recovery flow passage of the apparatus shown in FIG. 1.

According to the present embodiment, the liquid inlet port 58 of the liquid recovery flow passage 54 communicates with and is connected to a position upstream with respect to the discharge port of the opening/closing mechanism 26. Thus, while the opening/closing mechanism 26 of the discharge port 16 is closed, the liquid is separated and recovered from the discharge port by opening the opening/closing mechanism 60 of the liquid recovery flow passage 54 to bring the flow passage into the communication state. According to the present embodiment, the liquid recovery flow passage 54 is connected to the discharge cylinder 36 in the orthogonal direction, thereby arranging the recovery path R2 of the liquid in the orthogonal direction with respect to the discharge path R1 of the waste. In other words, when the opening/closing mechanism 26 is closed, the liquid flows in the orthogonal direction with respect to a direction of a deposit pressure of the waste in the sealed vessel. As a result, the simple structure hardly allows the entrance of the waste into the liquid inlet port 58, and it is thus possible to flow only the liquid by gravity into the liquid recovery flow passage 54, thereby properly separating and recovering the liquid. If the momentum of the liquid in the sealed vessel 12 flowing to the liquid inlet port 56 is too strong, the waste may also flow off due to the force of the flow of the liquid, and the connection configurations of the liquid recovery flow passage, the liquid inlet port, and the like are thus preferably set so that the flow is gentle enough not to flow off the treated waste. According to the present embodiment, the liquid recovery flow passage 54 from the liquid inlet port 58 is horizontally provided, thereby setting the flow speed of the gravity flow to the liquid inlet port relatively low. According to the embodiment in FIG. 1, the liquid recovery flow passage 54 is generally horizontally provided from the side communicating with the discharge port 16 (the side of the liquid inlet port) to the side of the recovery unit. As a result, the liquid smoothly flows in the liquid recovery flow passage, and flows by gravity from the discharge port to the recovery unit. It should be noted that the liquid recovery flow passage 54 may be provided as a slope inclining downward toward the side of the recovery unit as shown in FIG. 3, thereby more smoothly flowing the liquid in the liquid recovery flow passage 54. In FIG. 3, a long dashed short dashed line X represents the horizontal direction. On this occasion, the liquid recovery flow passage 54 may be provided horizontally down to a certain point on the side of the liquid inlet port 58, and may then be provided as a slope inclining downward thereafter, for example. Moreover, as shown in FIG. 2, a filter 59 and the like may be provided in the liquid inlet port 58, if necessary.

Moreover, as shown in FIG. 1, according to the present embodiment, the gravity flow recovery mechanism 52 includes equal pressure forming means 62 which causes the closed space S1 of the sealed vessel 12 and the closed space S2 of the recovery unit 50 to have an equal pressure before the recovery operation of the liquid. Generally the pressure inside of the sealed vessel 12 is high after the treatment, and a force causing a press feed is thus generated in the liquid recovery flow passage due to a difference in pressure toward the closed space S2 of the recovery unit, which is low in pressure compared with the sealed vessel. When this press-feed force is applied, both the liquid and the waste flow into the liquid recovery flow passage 54, it is thus difficult to separate and recover the liquid and the waste, and the waste highly probably block the liquid recovery flow passage. As in the present embodiment, setting the two closed space S1 and S2 of the sealed vessel 12 and recovery unit 50 to an equal pressure by means of the equal pressure forming means 62 before the recovery operation of the liquid can prevent the waste from being fed by the pressure generated by a difference in pressure between the two closed spaces S1 and S2, resulting in a proper recovery in the recovery unit by means of the gravity flow of the liquid while the waste is separated. Moreover, even if the pressure is high in the sealed vessel after the treatment, the separation and recovery operation can be carried out, resulting in a reduction of the operation period.

According to the present embodiment, the equal pressure forming means 62 includes an equal pressure communication pipe 64 that causes the closed space S1 of the sealed vessel 12 and the closed space S2 of the recovering unit 50 to communicate with each other via a path R3 different from the recovery path R2 of the liquid via the discharge port 16 (liquid recovery flow passage 54 according to the present embodiment). The equal pressure communication pipe 64 is formed by a metal pipe, for example, and can cause the two closed spaces S1 and S2 to have the equal pressure efficiently with the simple structure. In FIG. 1, the equal pressure communication pipe 64 communicates with and is connected to the top end side in the center portion in the left/right direction of the sealed vessel 12 on one end, and communicates with and is connected to the top end side of the recovery unit 50 on the other end. According to the present embodiment, the communication between the equal pressure communication pipe 64 forming the different path R3 and the sealed vessel 12 is carried out via a communication/connection portion 68 set on the top end side of the sealed vessel 12. According to the present embodiment, a connection port of the communication/connection portion 68 with the sealed vessel is provided facing downward. As a result, the waste collected in the sealed vessel 12 hardly enter the equal pressure communication pipe 64, which prevents the waste from blocking the pipe, keeps the communication state of the equal pressure communication pipe, and causing the sealed vessel 12 and the recovery unit 50 surely to have the equal pressure. According to the present embodiment, the equal pressure communication pipe 64 is always in the communication state, and when the opening/closing mechanism 60 of the liquid recovery flow passage 54 is closed, the inside of the sealed vessel 12, the recovery unit 50, and the inside of the liquid recovery flow passage 54 have an equal pressure. As a result, immediately after the opening/closing mechanism 60 of the liquid recovery flow passage 54 is opened, it is possible to prevent the pressure feed of the waste due to the pressure difference on the side of the liquid inlet port 58 of the discharge port 16. Moreover, even if the opening/closing mechanism 60 is opened to recover the liquid, the inside of the sealed vessel 12 and the inside of the recovery unit 50 are always kept to an equal pressure. Therefore, the equal pressure is maintained from before the recovery to after the completion of the recovery, and it is thus possible to properly separate and recover only the liquid by means of the gravity flow from the discharge port 16. It should be noted that the equal pressure forming means 62 is not limited to the configuration according to the present embodiment, and may have an arbitrary configuration. For example, the equal pressure forming means 62 may include another high pressure forming apparatus which causes the inside of the recovery unit to have a high pressure, and adjusts the pressure inside the recovery unit to be equal to the pressure inside the sealed vessel while monitoring the pressure inside the sealed vessel. Moreover, the pressure inside the sealed vessel may be reduced.

A description will now be given of an operation of the apparatus for treatment of an organic waste according to the present embodiment, along with the method for separating and recovering a liquid according to the present embodiment. According to the present embodiment, the waste to be treated includes medical wastes which are disposed from medical institutions such as hospitals, universities, and other research institutes, and include blood, operated internal organs, absorbent cotton, disposable diapers, blood feeding tubes, intravenous bottles, resin injection syringes, and the like. It should be noted that metal and glass wastes such as needles for syringe are separated and removed in advance. While the opening/closing mechanism 26 of the discharge port 16 and the opening/closing mechanism 60 of the liquid recovery flow passage 54 are closed, the opening/closing mechanism 24 of the charge port of the sealed vessel 12 is opened, and the waste of approximately 2 m$^3$, for example, is charged. While the opening/closing mechanism 24 of the charge port is closed, and the sealed vessel 12 is thus closed, the steam at the high temperature and the high pressure set to approximately 250° C. and 25 atm, for example, is blown off from the steam jet pipe 28 of the steam jet means 14 into the sealed vessel. The blown-off steam causes the inside of the sealed vessel 12 to have the high temperature and the high pressure of approximately 250° C. and 25 atm, for example. Simultaneously, the equal pressure communication pipe 64 causes the closed space S2 of the recovery unit 50 to have the pressure equal to that inside the sealed vessel, which is a state at the high temperature and the high pressure of approximately 250° C. and 25 atm, for example. Under the condition of the high temperature and the high pressure, the waste is treated in the sealed vessel while the agitating blade 48 which is rotating is agitating and crushing the waste. The treatment is carried out while causal organisms contained in (or attached to) the waste are being sufficiently sterilized, and bad smell components are being decomposed. Moreover, since the flow passage is closed by the opening/closing mechanism 60 in the liquid recovery flow passage during the treatment, the water contained in the waste as well as the waste are treated by the steam at the high temperature and the high pressure. After the treatment is carried out for a desired period such as approximately 40 minutes, the waste is treated into a carbonized state where the waste is crushed into particles of approximately 0.3 to 0.8 mm, for example.

After the waste has been treated as described above, the treated waste and the liquid are mixed in the sealed vessel 12, and the liquid is first separated and recovered via the separating and recovering means. When the opening/closing mechanism 60 in the liquid recovery flow passage 54 is opened, the liquid flows by gravity from the discharge port to the liquid recovery flow passage, and is recovered in the recovery unit. In other words, in the method for recovering liquid according to the present embodiment, the sealed vessel, which treats the waste, is used as the first closed vessel, the recovery unit 50, which communicates with and is connected to the discharge port of the sealed vessel, and have a pressure equal to that of the sealed vessel 12 via the equal pressure communication pipe different from the discharge port, is used as the second closed vessel, and the liquid is flown by gravity via the discharge port while the sealed vessel and the recovery unit have the equal pressure as described above, thereby separating and recovering only the liquid into the recovery unit. Since the sealed vessel 12 and the recovery unit 50 have the equal pressure, the liquid and the waste together are not fed by the pressure, the only the liquid flows from the liquid inlet port 50 into the liquid recovery flow passage 54 as a result of the gravity flow of the liquid collected in the sealed vessel 12. Moreover, according to the present embodiment, since the sealed vessel and the recovery unit always have an equal pressure via the equal pressure communication pipe, it is possible to separate and recover the liquid immediately after the treatment of the waste, thereby reducing the operation period. For example, after the waste is let stand for approximately 15 to 20 minutes, for example, for separating and recovering the liquid by means of the gravity flow, the opening/closing mechanism 26 of the discharge port 16 of the sealed vessel 12 is opened to discharge the treated waste. The treated waste contains water of approximately 30%, for example, is carbonized while the liquid is almost separated, and can thus be recovered in a state convenient for transportation, management, and the like. As a result, only the single apparatus can treat the waste, and can separate and recover the waste and the liquid. Moreover, it is not necessary to bring the waste mixed with the liquid, which is difficult in handling, to the outside, and the waste can thus be separated and recovered directly from the sealed vessel by means of a simple and smooth operation continuously to the treatment. Moreover, the configuration for the separation and recovery is simple, and can be manufactured at a low cost. It should be noted that the respective opening/closing mechanisms may be opened/closed by a manual operation or by a mechanical operation using electricity or the like.

The above-described apparatus for treatment of an organic material and method for separating and recovering a liquid according to the present invention are not limited only to the configuration according the above-described embodiments, and may be arbitrarily modified within a scope without departing from essential characteristics of the present invention described in claims.

INDUSTRIAL APPLICABILITY

The apparatus for treatment of an organic material and the method for separating and recovering a liquid according to the present invention are used for treating synthetic resin wastes such as plastic, as well as raw garbage, and sewage sludge disposed from general households, medical institutions, plants, and treatment sites for example.

The invention claimed is:

1. An apparatus for treatment of an organic waste comprising:
   a first sealed vessel for containing the organic waste and treating the organic waste contained therein, the first sealed vessel having a discharge port at a bottom side;
   a steam jet part for jetting steam into the first sealed vessel for treating the organic waste contained within the first sealed vessel;
   a liquid inlet port disposed below and fluidly coupled to the discharge port, said liquid inlet port being open toward a substantially horizontal direction, for passing liquid;
   a first opening/closing mechanism disposed below the discharge port and fluidly coupled to the discharge port and the liquid inlet port, said first opening/closing mechanism having a treated waste discharge path for passing downward the organic waste treated within the first sealed vessel and downward discharged from the discharge port; and
   a second opening/closing mechanism disposed fluidly coupled to the discharge port via the liquid inlet port open toward the substantially horizontal direction, said second opening/closing mechanism having a liquid recovery path for passing the liquid, said liquid recovery path being branched from the treated waste discharge path below the discharge port, and said second opening/closing mechanism and said liquid inlet port having the liquid recovery path,
   wherein when the first opening/closing mechanism is closed and the second opening/closing mechanism is open, the liquid includes a liquid having been separated from the treated organic waste discharged from the discharge port, said separated liquid passes through the second opening/closing mechanism, and
   when the first opening/closing mechanism is open the first opening/closing mechanism passes downward the treated organic waste discharged from the discharge port without the separated liquid having passed through the second opening/closing mechanism when the first opening/closing mechanism is closed.

2. The apparatus for treating an organic waste according to claim 1, further comprising:
   a liquid conduit for forming the liquid recovery path with both the second opening/closing mechanism and the liquid inlet port open toward the substantially horizontal direction; and
   a liquid recovery unit fluidly coupled to the liquid conduit, for containing liquid passed through the liquid conduit.

3. The apparatus for treating an organic waste according to claim 2 further comprising: an equal pressure forming part that is adapted to equalize a pressure inside the liquid recovery unit with a pressure inside the first sealed vessel when the second opening/closing mechanism is in an open position.

4. The apparatus for treating an organic waste according to claim 3, wherein the liquid recovery unit is a second sealed vessel, and the equal pressure forming part includes an equal pressure communication pipe for fluidly coupling the first sealed vessel to the second sealed vessel by a path different from the liquid recovery path.

5. The apparatus for treating an organic waste according to claim 3, wherein the equal pressure forming part is connected to a top end side of the first sealed vessel, the equal pressure forming part includes:
   a high pressure forming apparatus for increasing the pressure inside the liquid recovery unit.

6. The apparatus for treating an organic waste according to claim 3, wherein the liquid conduit is arranged to be horizontal or inclined downward from the second opening/closing mechanism to the second sealed vessel and not to have a portion shared with the equal pressure part.

7. The apparatus for treating an organic waste according to claim 3, wherein the first opening/closing mechanism includes an open-close valve for opening/closing the treated waste discharge path, the open-close valve having:
   a valve body with a through hole for passing the treated waste discharge path at the center of the valve body, and
   a rotation shaft orthogonal or substantially orthogonal to the treated waste discharge path;
   wherein the treated waste discharge path is adapted to open and to close by rotating the valve body about the rotation shaft, and
   wherein an upper end of the liquid inlet port open toward the substantially horizontal direction is located above an upper end of the through hole in the valve body.

8. The apparatus for treating an organic waste according to claim 3 further comprising:
   a support part for supporting the first sealed vessel; and
   an agitating part for agitating the organic waste in the first sealed vessel.

9. The apparatus for treating an organic waste according to claim 8, wherein the steam jet part includes:
   a steam jet pipe integrated into the rotation shaft, wherein the rotation shaft is formed as a hollow pipe, and is configured by forming a plurality of steam jet holes through a circumferential surface of the hollow pipe;
   a steam generating apparatus for generating steam; and
   a steam feed pipe for feeding steam from the steam generating apparatus to the inside of the steam jet pipe.

10. The apparatus for treating an organic waste according to claim 9, wherein the first opening/closing mechanism includes an open-close valve for opening/closing the treated waste discharge path, the open-close valve having:
    a valve body with a through hole for passing the treated waste discharge path at the center of the valve body, and
    a rotation shaft orthogonal or substantially orthogonal to the treated waste discharge path;
    wherein the treated waste discharge path is adapted to open and to close by rotating the valve body about the rotation shaft, and
    wherein an upper end of the liquid inlet port open toward the substantially horizontal direction is located above an upper end of the through hole in the valve body.

11. The apparatus for treating an organic waste according to claim 2 further comprising:
    a support part for supporting the first sealed vessel; and
    an agitating part for agitating the organic waste in the first sealed vessel.

12. The apparatus for treating an organic waste according to claim 2, wherein the steam jet part includes:
    a steam jet pipe integrated into the rotation shaft, wherein the rotation shaft is formed as a hollow pipe having a plurality of steam jet holes through a circumferential surface of the hollow pipe;
    a steam generating apparatus for generating steam; and
    a steam feed pipe for feeding steam from the steam generating apparatus to the inside of the steam jet pipe.

13. The apparatus for treating an organic waste according to claim 1, wherein the liquid inlet port open toward the horizontal direction is located at an upper end of the first opening/closing mechanism or with a position overlapping with an upper portion of the first opening/closing mechanism in a vertical position.

14. The apparatus for treating an organic waste according to claim 13, wherein the liquid inlet port that opens toward the substantially horizontal direction includes a filter.

15. The apparatus for treating an organic waste according to claim 1 further comprising an agitating part for agitating the organic waste in the first sealed vessel.

16. The apparatus for treating an organic waste according to claim 1, wherein the liquid inlet port that opens toward the substantially horizontal direction includes a filter.

17. The apparatus for treating an organic waste according to claim 16, wherein the first opening/closing mechanism includes an open-close valve for opening/closing the treated waste discharge path, the open-close valve having:
    a valve body with a through hole for passing the treated waste discharge path at the center of the valve body, and
    a rotation shaft orthogonal or substantially orthogonal to the treated waste discharge path;
    wherein the treated waste discharge path is adapted to open and to close by rotating the valve body about the rotation shaft; and
    wherein an upper end of the liquid inlet port open toward the substantially horizontal direction is located above an upper end of the through hole in the valve body.

18. The apparatus for treating an organic waste according to claim 1, wherein the first opening/closing mechanism includes an open-close valve for opening/closing the treated waste discharge path, the open-close valve having:
    a valve body with a through hole for passing the treated waste discharge path at the center of the valve body, and
    a rotation shaft orthogonal or substantially orthogonal to the treated waste discharge path;
    wherein the treated waste discharge path is adapted to open and to close by rotating the valve body about the rotation shaft; and
    wherein an upper end of the liquid inlet port that opens toward the substantially horizontal direction is located above an upper end of the through hole in the valve body.

19. A method for treating an organic waste wherein an apparatus for treatment of an organic waste comprising:
    a first sealed vessel having a discharge port at a bottom side;
    a steam jet part for jetting steam into the first sealed vessel for treating the organic waste contained within the first sealed vessel;
    a liquid inlet port disposed below and fluidly coupled to the discharge port, said liquid inlet port being open toward a substantially horizontal direction, for passing liquid;

a first opening/closing mechanism disposed below the discharge port and fluidly coupled to the discharge port and the liquid inlet port, said first opening/closing mechanism having a treated waste discharge path;
a second opening/closing mechanism disposed fluidly coupled to the liquid inlet port open toward the horizontal direction, said second opening/closing mechanism having a liquid recovery path for passing the liquid, said liquid recovery path being branched from the treated waste discharge path below the discharge port, and said second opening/closing mechanism and said liquid inlet port having the liquid recovery path;
a liquid recovery unit;
an equal pressure part fluidly coupled to both the first sealed vessel and the liquid recovery unit; and
a fluid communication fluidly coupled to both the second opening/closing mechanism and the liquid recovery unit, said fluid communication different from the equal pressure part, the method comprising:
treating the organic waste in the first sealed vessel using steam to collect the organic waste treated by the steam to the discharge port when both the first opening/closing mechanism and the second opening/closing mechanism are closed;
separating liquid from the treated organic waste to flow the liquid separated from the treated organic waste into the liquid recovery unit via the liquid inlet port, the second opening/closing mechanism and the fluid communication when the second opening/closing mechanism is open while the first opening/closing mechanism is closed and when the pressure within the liquid recovery unit is substantially equal to the pressure within the first sealed vessel; and
when the first opening/closing mechanism is open, dropping down the treated organic waste without the separated liquid flown into the liquid recovery unit via the first opening/closing mechanism.

20. The method for treating an organic waste according to claim 19, wherein the liquid inlet port open toward the substantially horizontal direction is located at an upper end of the first opening/closing mechanism or with a position overlapping with an upper portion of the first opening/closing mechanism in a vertical position.

21. The method for treating an organic waste according to claim 19, wherein the method further comprises equalizing a pressure within the liquid recovery unit to a pressure within the first sealed vessel via the equal pressure part after the organic waste has been treated and when both the first opening/closing mechanism and the second opening/closing mechanism are closed.

* * * * *